(12) United States Patent
Tsukamoto

(10) Patent No.: US 10,979,598 B2
(45) Date of Patent: Apr. 13, 2021

(54) CONFERENCE MANAGEMENT APPARATUS, DOCUMENT REGISTRATION METHOD, PROGRAM, AND CONFERENCE SYSTEM

(71) Applicant: Yuka Tsukamoto, Tokyo (JP)

(72) Inventor: Yuka Tsukamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 279 days.

(21) Appl. No.: 15/320,359

(22) PCT Filed: Aug. 19, 2015

(86) PCT No.: PCT/JP2015/004140
§ 371 (c)(1),
(2) Date: Dec. 20, 2016

(87) PCT Pub. No.: WO2016/031183
PCT Pub. Date: Mar. 3, 2016

(65) Prior Publication Data
US 2017/0208212 A1 Jul. 20, 2017

(30) Foreign Application Priority Data
Aug. 25, 2014 (JP) .............................. JP2014-170717

(51) Int. Cl.
*H04L 12/18* (2006.01)
*H04N 1/42* (2006.01)
(Continued)

(52) U.S. Cl.
CPC ........... *H04N 1/42* (2013.01); *H04L 12/1818* (2013.01); *H04L 12/1822* (2013.01);
(Continued)

(58) Field of Classification Search
CPC .. H04N 1/42; H04N 1/00217; H04N 1/00413; H04N 7/15; H04L 12/1818; H04L 12/1822; H04L 12/1831; H04M 3/567
See application file for complete search history.

(56) References Cited

U.S. PATENT DOCUMENTS 6,317,777 B1 * 11/2001 Skarbo .............. G06F 17/30887
348/E7.083
7,698,316 B2 * 4/2010 Song ........................ G06N 5/02
707/608
(Continued)

FOREIGN PATENT DOCUMENTS

EP 1533733 5/2005
JP 2006-279535 10/2006
(Continued)

OTHER PUBLICATIONS

International Search Report dated Nov. 24, 2015 in PCT/JP2015/004140 filed on Aug. 19, 2015.
(Continued)

*Primary Examiner* — Alvin H Tan
(74) *Attorney, Agent, or Firm* — IPUSA, PLLC

(57) ABSTRACT

A conference management apparatus, a document registration method, a program and a conference system for easily registering a document for one or more agenda items registered for a conference are provided. A conference management apparatus for managing a conference held among a plurality of terminal apparatuses includes a generation unit configured to generate identification information of a document registration screen used for registering a document for one or more agenda items registered for a conference and send the identification information of the document registration screen to a terminal apparatus of a user registering a document for the agenda item, and a document registration unit configured to, based on a screen data obtaining request
(Continued)

specifying the identification information of the document registration screen, send screen data of the document registration screen to the terminal apparatus which is a source of the screen data obtaining request, and register the document the user has registered for the agenda item in the document registration screen displayed on the terminal apparatus of the source of the screen data obtaining request, the document being associated with the agenda item.

16 Claims, 18 Drawing Sheets

(51) Int. Cl.
| | |
|---|---|
| *H04N 7/15* | (2006.01) |
| *H04L 12/58* | (2006.01) |
| *H04N 1/00* | (2006.01) |
| *H04N 1/21* | (2006.01) |
| *H04M 3/56* | (2006.01) |

(52) U.S. Cl.
CPC .......... *H04L 12/1831* (2013.01); *H04L 51/10* (2013.01); *H04N 1/00217* (2013.01); *H04N 1/00413* (2013.01); *H04N 1/2179* (2013.01); *H04N 7/152* (2013.01); *H04M 3/567* (2013.01)

(56) References Cited

U.S. PATENT DOCUMENTS

| | | | |
|---|---|---|---|
| 8,743,022 B2 | 6/2014 | Masuda et al. | |
| 9,824,333 B2* | 11/2017 | Shaw | G06Q 10/109 |
| 9,824,335 B1* | 11/2017 | Vander Mey | G06Q 10/107 |
| 10,200,468 B2* | 2/2019 | Leban | G06Q 10/109 |
| 2001/0034738 A1* | 10/2001 | Cantwell | G06Q 10/10 715/255 |
| 2004/0146048 A1* | 7/2004 | Cotte | H04L 29/06027 370/352 |
| 2006/0010023 A1* | 1/2006 | Tromczynski | G06Q 10/06314 705/7.25 |
| 2006/0200517 A1* | 9/2006 | Nelson | H04L 65/4023 709/204 |
| 2007/0286387 A1 | 12/2007 | Fuse et al. | |
| 2007/0300165 A1* | 12/2007 | Haveliwala | G06F 3/0482 715/758 |
| 2008/0065447 A1 | 3/2008 | Evanchik et al. | |
| 2008/0162425 A1* | 7/2008 | Grennan | G06F 17/2235 |
| 2009/0222741 A1 | 9/2009 | Shaw et al. | |
| 2009/0234680 A1* | 9/2009 | Newton | G06Q 10/02 705/5 |
| 2010/0205540 A1* | 8/2010 | Gupta | G06Q 10/107 715/753 |
| 2011/0014929 A1* | 1/2011 | Moshfeghi | H04W 4/02 455/456.3 |
| 2011/0271129 A1* | 11/2011 | Flannagan | H04L 12/1822 713/323 |
| 2011/0289142 A1* | 11/2011 | Whalin | G06Q 10/10 709/203 |
| 2011/0289433 A1* | 11/2011 | Whalin | G06Q 10/10 715/753 |
| 2012/0179980 A1* | 7/2012 | Whalin | H04W 4/21 715/753 |
| 2012/0278408 A1* | 11/2012 | Seferian | G06Q 10/1095 709/206 |
| 2013/0110836 A1* | 5/2013 | Tomberg | G06Q 10/10 707/737 |
| 2013/0159416 A1* | 6/2013 | Hirabayashi | H04L 65/403 709/204 |
| 2013/0226645 A1* | 8/2013 | Renaghan | G06Q 10/1095 705/7.19 |
| 2013/0238358 A1 | 9/2013 | Yamane et al. | |
| 2013/0263021 A1* | 10/2013 | Dunn | H04L 12/1827 715/756 |
| 2013/0305167 A1* | 11/2013 | Bastide | H04L 65/1069 715/753 |
| 2014/0225810 A1 | 8/2014 | Masuda et al. | |
| 2014/0258214 A1 | 9/2014 | Tsukamoto | |
| 2015/0149549 A1 | 5/2015 | Tsukamoto | |
| 2015/0169743 A1* | 6/2015 | Moriwaki | G06Q 30/02 707/739 |
| 2015/0347966 A1* | 12/2015 | Saunders | G06Q 10/10 705/342 |
| 2015/0363733 A1* | 12/2015 | Brown | G06Q 10/06316 705/7.26 |
| 2016/0026978 A1* | 1/2016 | Li | G06Q 10/1095 705/7.19 |
| 2016/0057388 A1* | 2/2016 | Rung | H04N 7/15 348/14.08 |

FOREIGN PATENT DOCUMENTS

| | | |
|---|---|---|
| JP | 2011-228817 | 11/2011 |
| JP | 2012-108872 | 6/2012 |
| JP | 2012-142759 | 7/2012 |
| JP | 2013-232125 | 11/2013 |

OTHER PUBLICATIONS

Extended European Search Report for 15836745.8 dated Jul. 19, 2017.
European Office Action for 15836745.8 dated Feb. 14, 2019.

* cited by examiner

[Fig. 1]
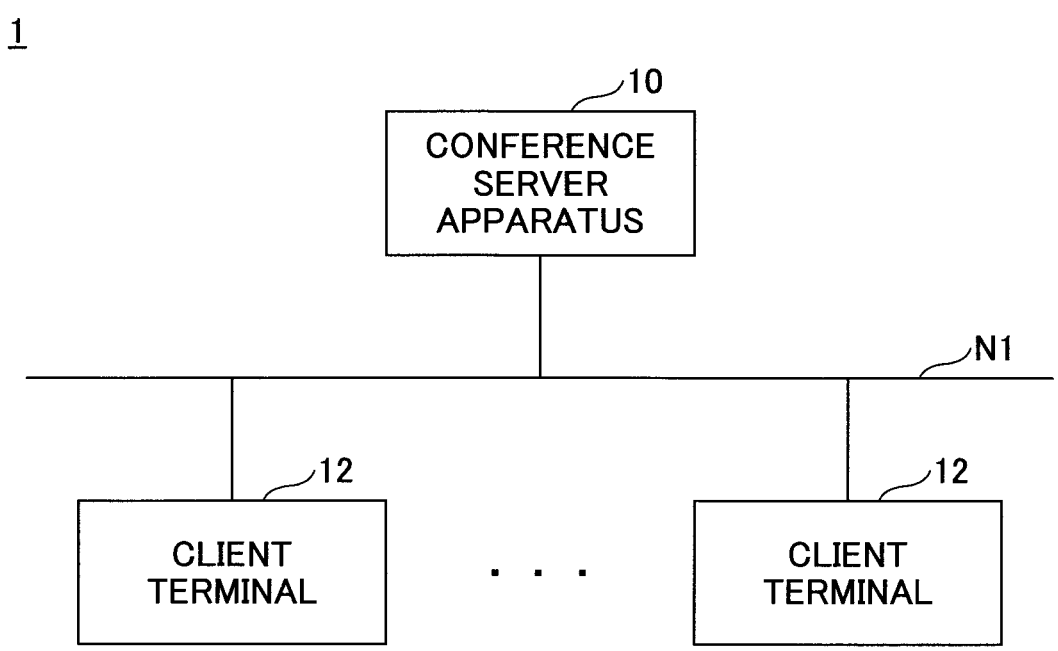

[Fig. 2]
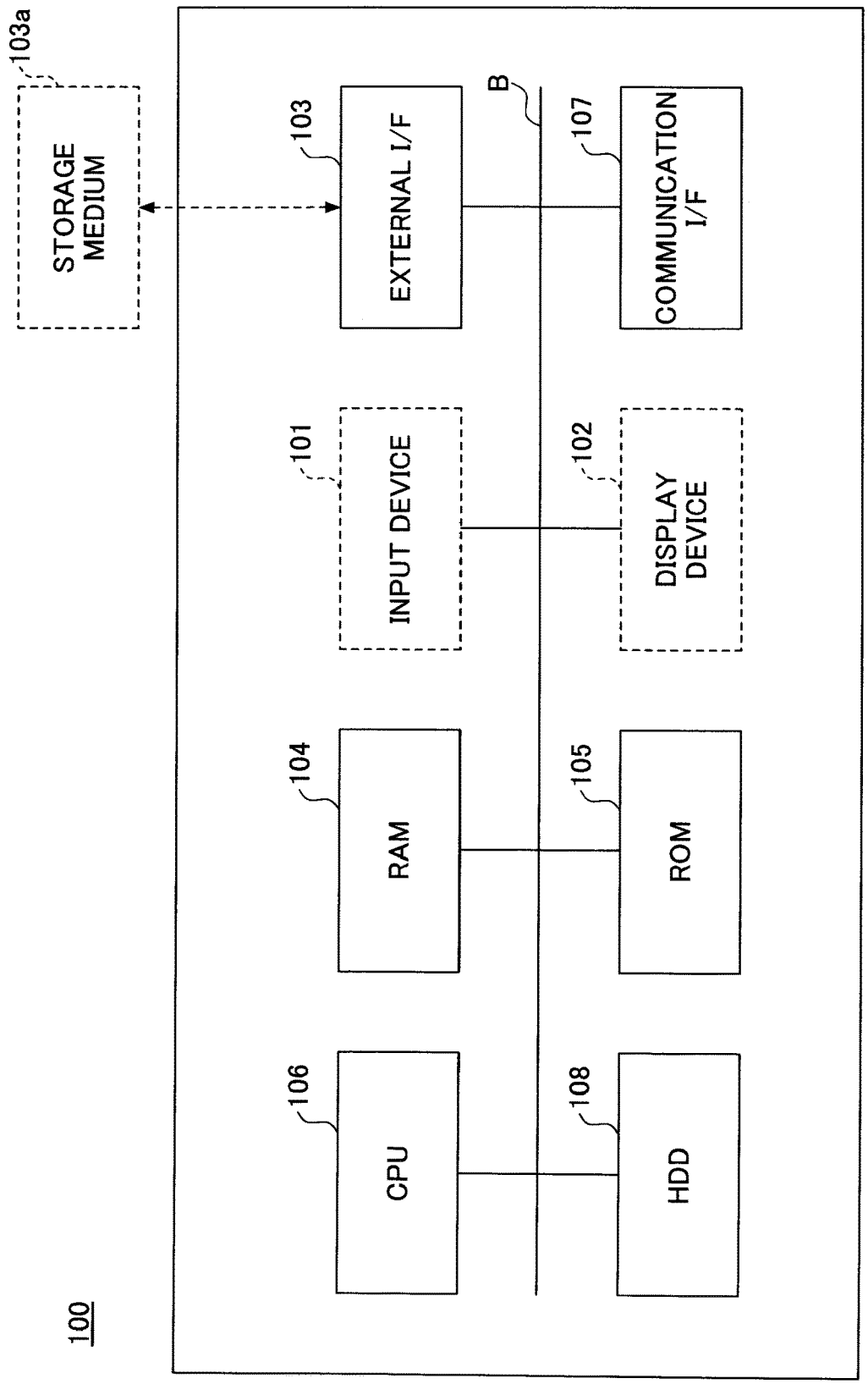

[Fig. 3]
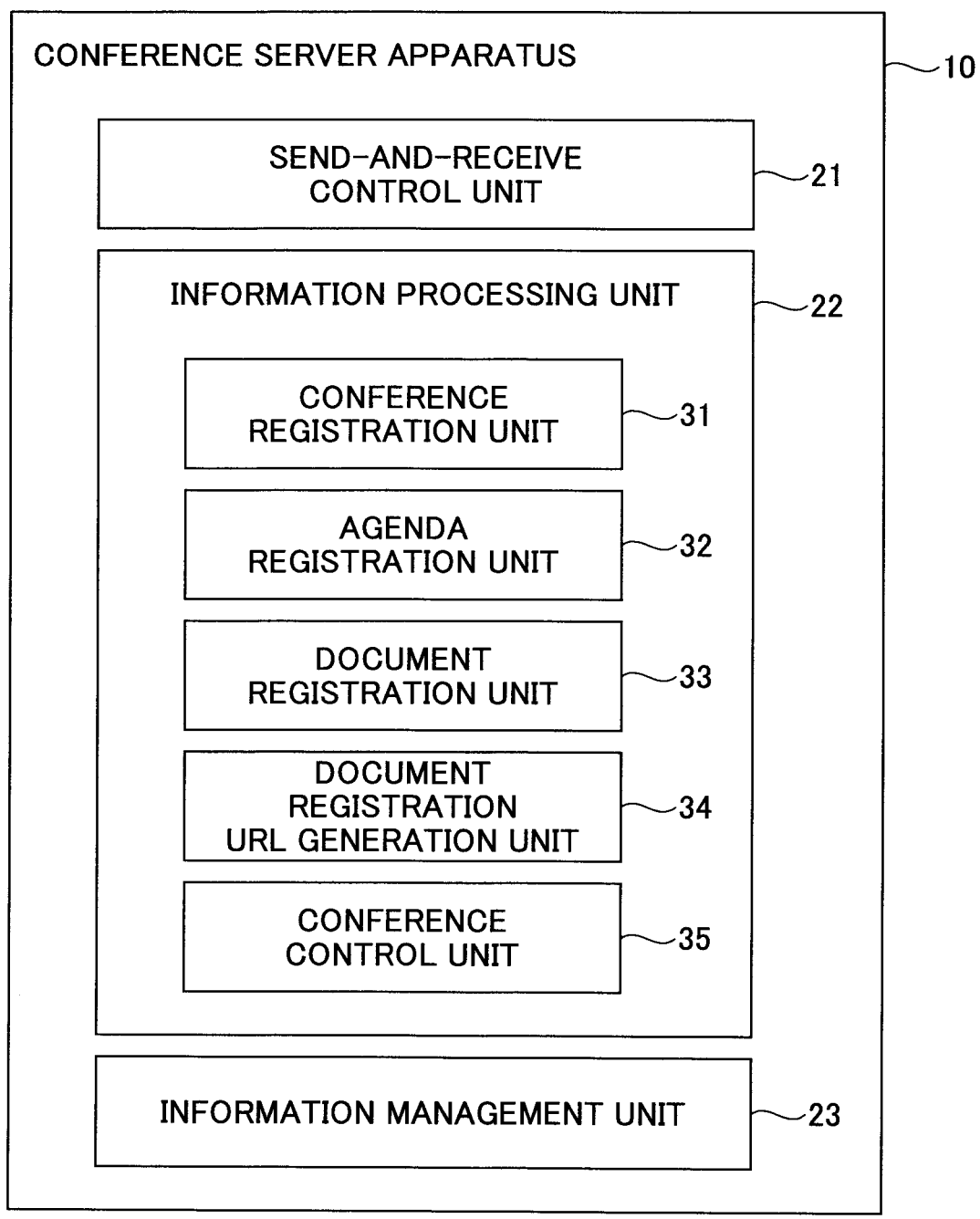

[Fig. 4]
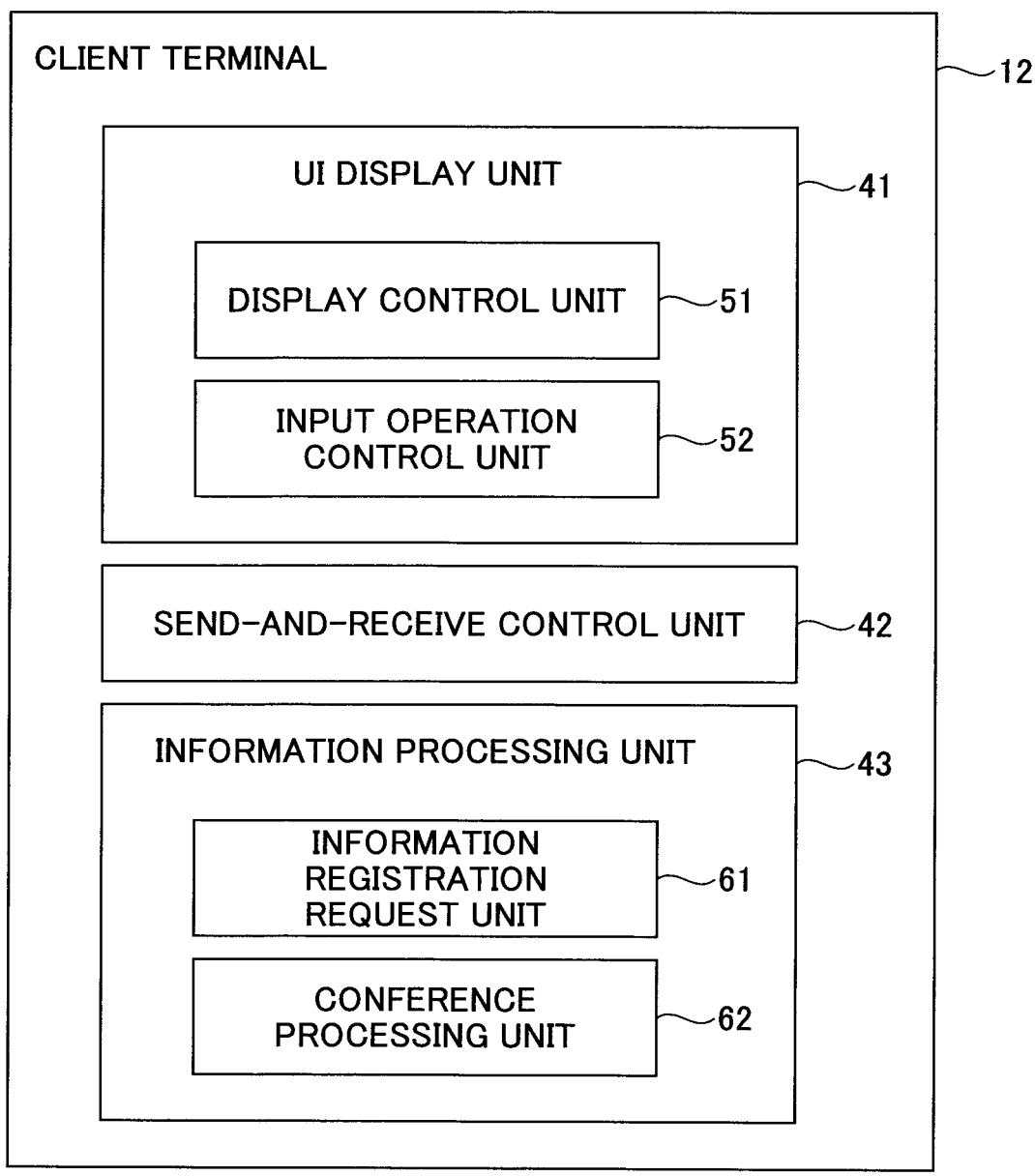

[Fig. 5]

| CONFERENCE ID | CONFERENCE NAME | STARTING DATE AND TIME | CONFERENCE STATE | WITH AGENDA /WITHOUT AGENDA |
|---|---|---|---|---|
| 111 | ○○○○ | △△△△ | BEFORE CONFERENCE | WITHOUT |
| 222 | ○○○○○ | △△△△△ | BEFORE CONFERENCE | WITH |
| ... | ... | ... | ... | ... |

[Fig. 6]

| AGENDA ID | CONFERENCE ID | AGENDA ITEM NAME | PRESENTER | PRESENTATION TIME | |
|---|---|---|---|---|---|
| AAA | 222 | ○○○○○○ | ××××  | □□□ | ... |
| BBB | 222 | ○○○ | ×××××× | ■■■ | ... |
| ... | ... | ... | ... | ... | ... |

[Fig. 7]

| DOCUMENT ID | AGENDA ID | CONFERENCE ID | DOCUMENT NAME | STORED LOCATION | ... |
|---|---|---|---|---|---|
| α | AAA | 222 | ☆☆☆ | ◇◇◇ | ... |
| β | AAA | 222 | ☆☆ | ◇ | ... |
| γ | | 111 | ★★★ | ◆◆◆◆ | ... |
| ... | ... | ... | ... | ... | ... |

[Fig. 8]
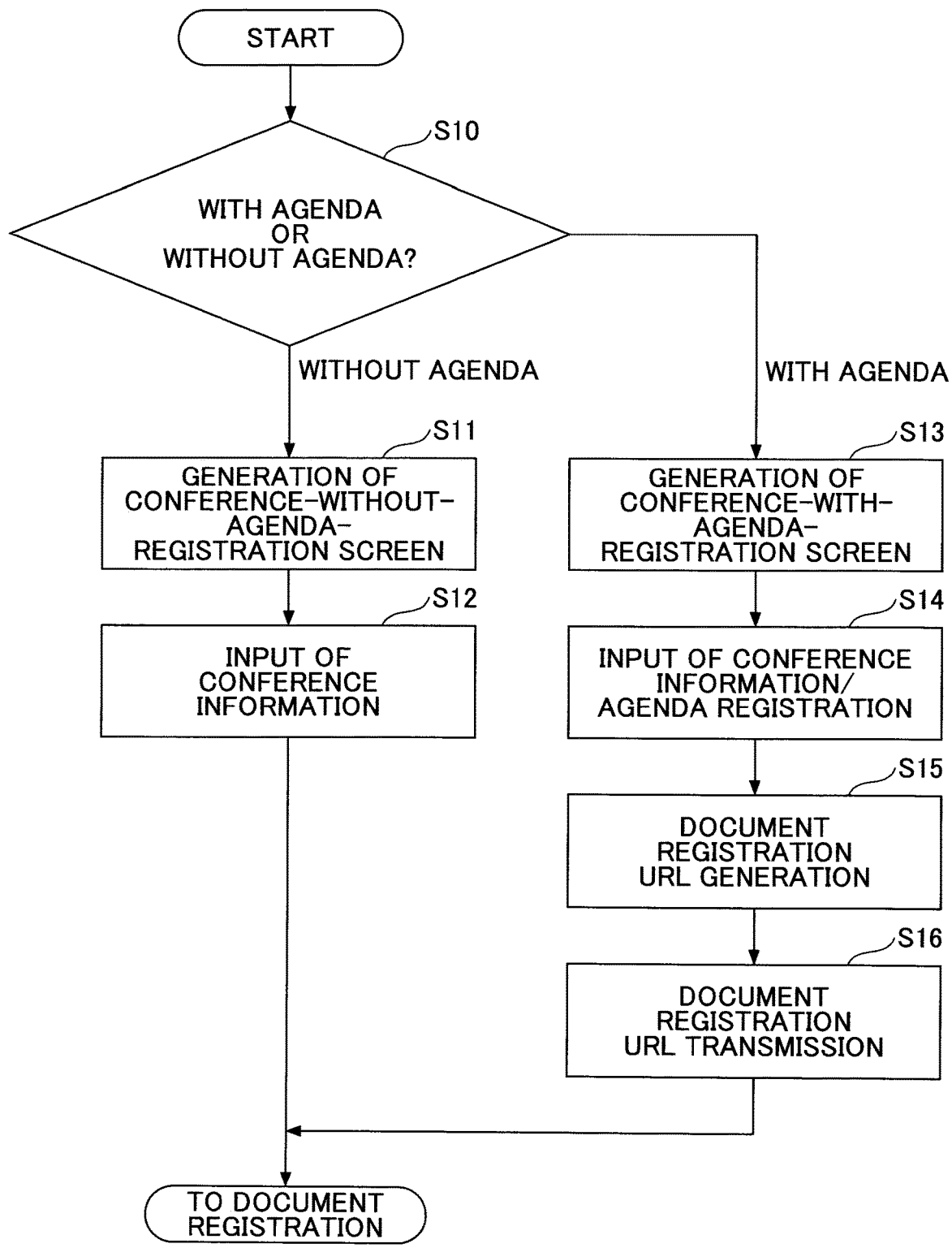

[Fig. 9]

| Conference Center | CONFERENCE MANAGEMENT/NEW CONFERENCE REGISTRATION | | |
|---|---|---|---|
| | ○ INPUT INFORMATION OF CONFERENCE TO BE REGISTERED. INFORMATION | | |
| START/PARTICIPATE<br>📅 TODAY'S CONFERENCE<br>CONFERENCE MANAGEMENT<br>% A LIST OF CONFERENCES<br>+ NEW CONFERENCE REGISTRATION<br>OTHERS<br>? HELP<br>ⓘ ABOUT APPLICATION | CONFERENCE NAME    MANDATORY | | |
| | NEW CONFERENCE REGISTRATION — 1000 | | |
| | ❓ DO YOU SET AGENDA FOR THE CONFERENCE?<br>IF YOU SET AGENDA, THEN YOU CAN REGISTER PRESENTER, PRESENTATION TIME, AND DOCUMENT FOR EACH AGENDA ITEM.<br>○ SET AGENDA<br>⦿ DO NOT SET AGENDA     1001 — [ CONTINUE ] | | |
| | IN CONFERENCE LIST, CONFERENCE NAME SHOULD BE | ⦿ DISPLAYED ○ NOT DISPLAYED | |
| | DOWNLOAD OF DOCUMENT SHOULD BE | ⦿ PERMITTED ○ NOT PERMITTED | |
| | PRESENTER REPLACEMENT PROHIBITION | NO MODIFICATION IS ALLOWED ONLY AT CONFERENCE START KEY INPUT TIMINIG. | |
| | AGENDA | | |

[Fig. 10]

Conference Center

START/PARTICIPATE
- 📅 TODAY'S CONFERENCE

CONFERENCE MANAGEMENT
- 🔍 A LIST OF CONFERENCES
- ➕ NEW CONFERENCE REGISTRATION

OTHERS
- ❓ HELP
- ⓘ ABOUT APPLICATION

CONFERENCE MANAGEMENT/NEW CONFERENCE REGISTRATION ~1100

○ INPUT INFORMATION OF CONFERENCE TO BE REGISTERED.

INFORMATION

| CONFERENCE NAME | MANDATORY |
| | ⓘ INPUT VALUE IN THIS COLUMN. |
| STARTING DATE AND TIME | MANDATORY  MANDATORY |
| REMARKS | |
| PARTICIPATION PASSWORD | ___ RE-ENTER ___ |
| STARTING KEY | ___ RE-ENTER ___ |
| IN CONFERENCE LIST CONFERENCE NAME SHOULD BE | ⦿ DISPLAYED  ○ NOT DISPLAYED |
| DOWNLOAD OF DOCUMENT SHOULD BE | ⦿ PERMITTED  ○ NOT PERMITTED |
| PRESENTER REPLACEMENT PROHIBITION | NO |
| | MODIFICATION IS ALLOWED ONLY AT CONFERENCE START KEY INPUT TIMING. |

DOCUMENT

[ ADD ]~1102  [ MODIFY ]  [ DELETE ]

[ SAVE ]~1101

[Fig. 11]

(Figure 11 shows a screenshot of a "Conference Management/Conference-With-Agenda Registration" interface — element 1200 — with a left sidebar containing "Conference Center", "START/PARTICIPATE" (TODAY'S CONFERENCE, CONFERENCE MANAGEMENT, A LIST OF CONFERENCES, NEW CONFERENCE REGISTRATION), and "OTHERS" (HELP, ABOUT APPLICATION). The main panel reads "INPUT INFORMATION OF CONFERENCE TO BE REGISTERED." with fields: CONFERENCE NAME [MANDATORY] ① INPUT VALUE IN THIS COLUMN., STARTING DATE AND TIME [MANDATORY] [MANDATORY], ENDING DATE AND TIME, LOCATION, REMARKS, PARTICIPATION PASSWORD [ ] RE-ENTER [ ], STARTING KEY [ ] RE-ENTER [ ], IN CONFERENCE LIST CONFERENCE NAME SHOULD BE ●DISPLAYED ○NOT DISPLAYED, DOWNLOAD OF DOCUMENT SHOULD BE ●PERMITTED ○NOT PERMITTED, PRESENTER REPLACEMENT PROHIBITION NO MODIFICATION IS ALLOWED ONLY AT CONFERENCE START KEY INPUT TIMING. AGENDA [ADD — 1201] [MODIFY] [DELETE] [DOCUMENT EDIT — 1202] [SAVE — 1203].)

[Fig. 12]

| Conference Center | CONFERENCE MANAGEMENT/CONFERENCE LIST/CONFERENCE DETAIL /AGENDA EDIT | | | | 1300 |
|---|---|---|---|---|---|
| | ○ CONFERENCE AGENDA ITEMS CAN BE CHANGED. ○ ORDER CHANGE OF AGENDA ITEMS IS SAVED IMMEDIATELY. | | | | |
| START/PARTICIPATE | # | AGENDA ITEM NAME | PRESENTER | NUMBER OF DOCUMENTS | |
| 📅 TODAY'S CONFERENCE | ○ 1 | ABOUT ConferenceCenter | MASUMOTO | 3 | ⊠ |
| CONFERENCE MANAGEMENT | ○ 2 | ABOUT SmartPresenter | KAWAKUBO | 2 | ⊠ |
| ⁒ A LIST OF CONFERENCES | ○ 3 | BREAK | | 0 | ⊠ |
| ＋ NEW CONFERENCE REGISTRATION | ○ 4 | GENERAL COMMENT | KOIKE | 0 | ⊠ 1303 |
| | ADD  1301 | MODIFY | DELETE | DOCUMENT EDIT | |
| OTHERS | CLOSE  1302 | | | | |
| ❓ HELP | | | | | |
| ⓘ ABOUT APPLICATION | | | | | |

[Fig. 13]
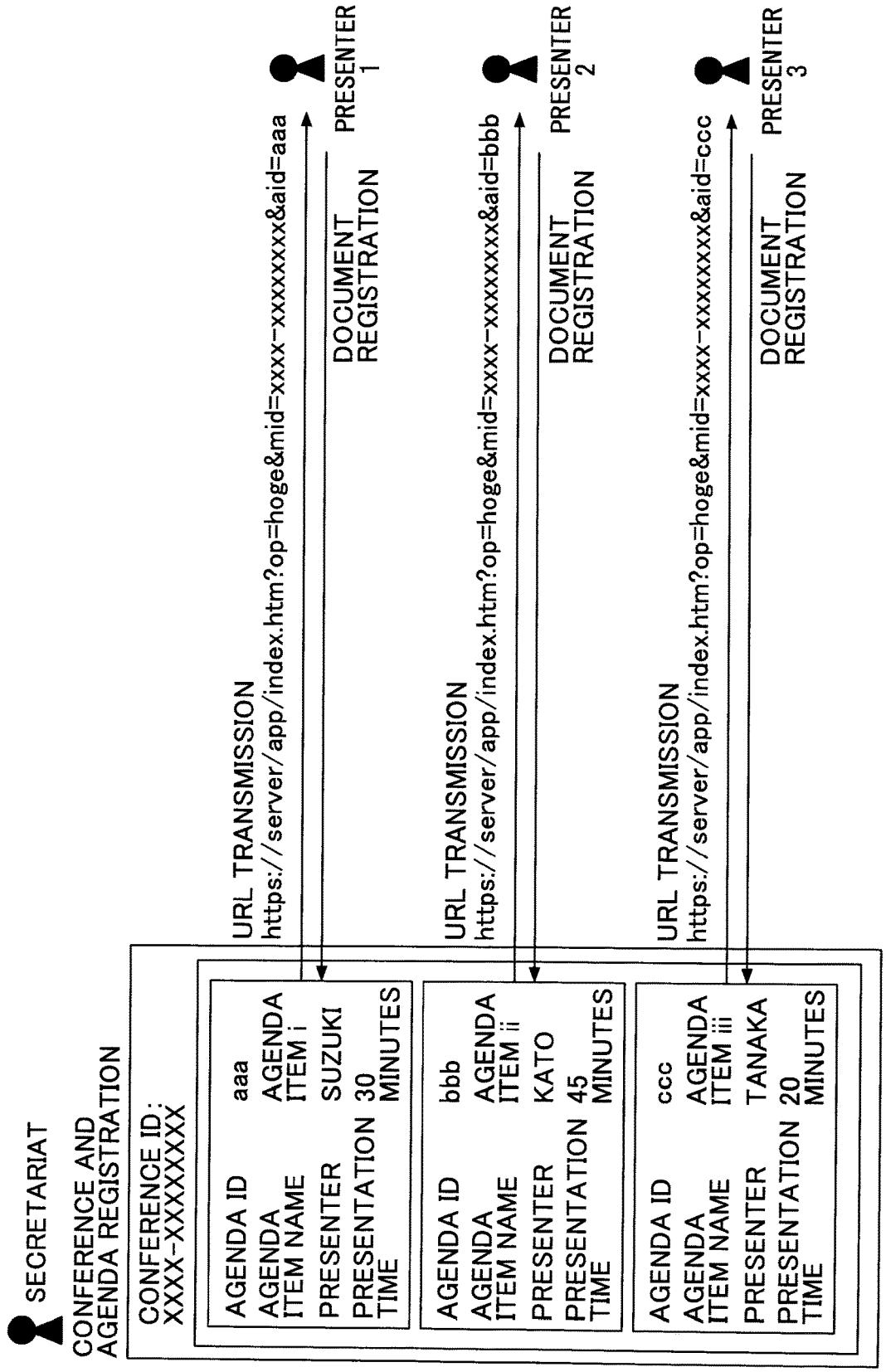

[Fig. 14]
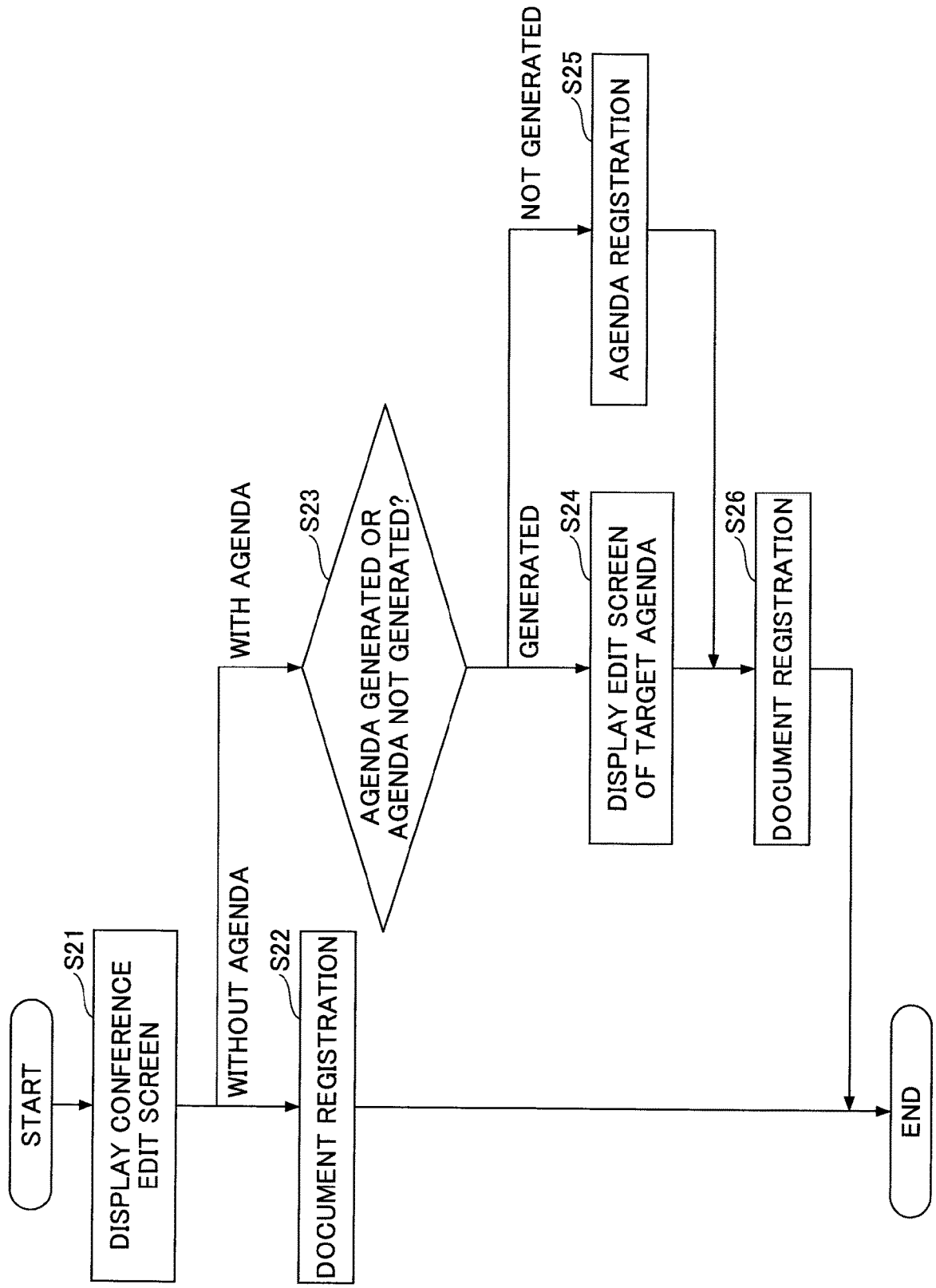

[Fig. 15]

| BEFORE DOCUMENT REGISTRATION | |
|---|---|
| Conference Center | CONFERENCE MANAGEMENT/CONFERENCE LIST/CONFERENCE DETAIL /AGENDA DOCUMENT EDIT |
| START/PARTICIPATE | ○ AGENDA DOCUMENT CAN BE CHANGED. ○ ORDER CHANGE OF DOCUMENT IS SAVED IMMEDIATELY. INFORMATION |
| ■ TODAY'S CONFERENCE | AGENDA ITEM NAME    ABOUT YYY ORIENTATION |
| CONFERENCE MANAGEMENT | PRESENTER    SUZUKI |
| ⌖ A LIST OF CONFERENCES | PRESENTATION TIME    30 MINUTES |
| ✚ NEW CONFERENCE REGISTRATION | DOCUMENT |
| | ADD  ~1401   MODIFY   DELETE |
| OTHERS | CLOSE |
| ⓘ HELP | |
| ⓘ ABOUT APPLICATION | |

AFTER DOCUMENT REGISTRATION

Conference Center — CONFERENCE MANAGEMENT/CONFERENCE LIST/CONFERENCE DETAIL /AGENDA DOCUMENT EDIT ○ AGENDA DOCUMENT CAN BE CHANGED.
○ ORDER CHANGE OF DOCUMENT IS SAVED IMMEDIATELY.

START/PARTICIPATE
- 📅 TODAY'S CONFERENCE

CONFERENCE MANAGEMENT
- ⌕ A LIST OF CONFERENCES
- ＋ NEW CONFERENCE REGISTRATION

OTHERS
- ? HELP
- ⓘ ABOUT APPLICATION

INFORMATION

| AGENDA ITEM NAME | ABOUT YYY ORIENTATION |
|---|---|
| PRESENTER | SUZUKI |
| PRESENTATION TIME | 30 MINUTES |

DOCUMENT

| # | DOCUMENT NAME | REMARKS | SOURCE FILE |
|---|---|---|---|
| ○ 1 | CURRENT SITUATION OF YYY | ABOUT CURRENT SITUATION (10 MINUTES) | EXIST |
| ○ 2 | PROBLEM OF YYY | WHAT IS THE PROBLEM? (10 MINUTES) | EXIST |
| ○ 3 | WHAT SHOULD BE DONE FOR YYY? | MY OPINION (5 MINUTES) | EXIST |

[ ADD ]   [ MODIFY ]   [ DELETE ]

[ CLOSE ]

1500

[Fig. 17]
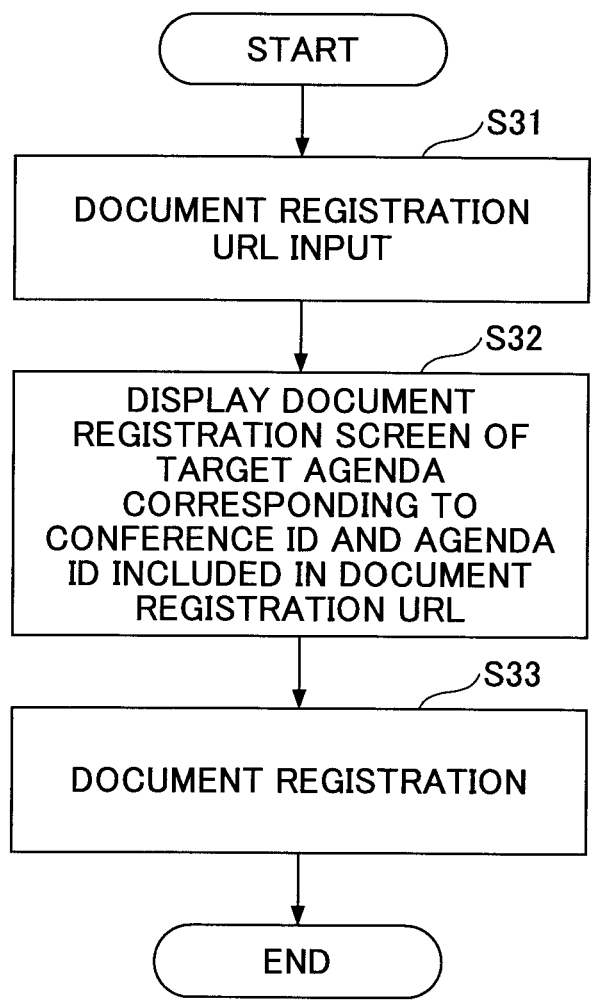

[Fig. 18]
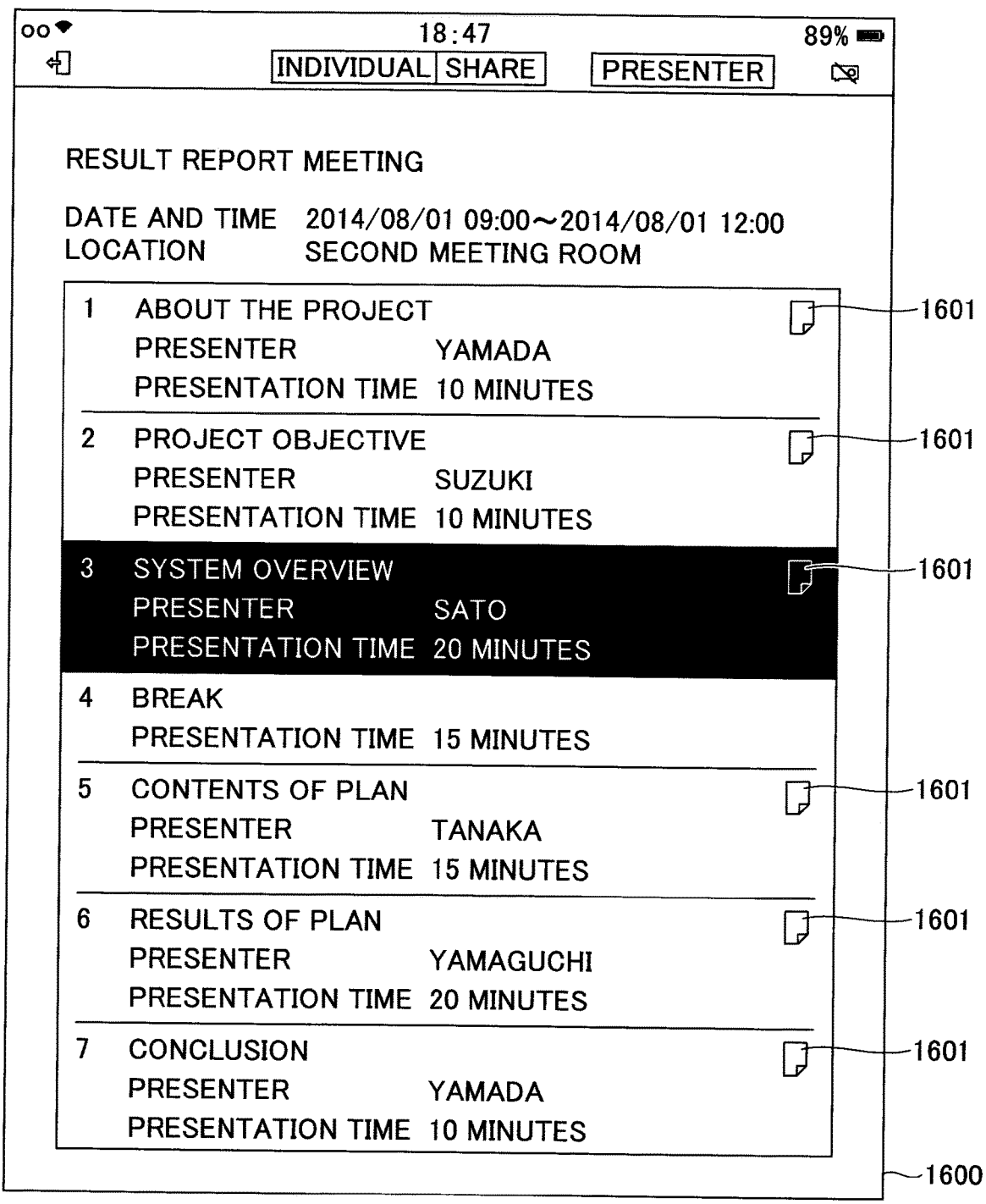

US 10,979,598 B2

CONFERENCE MANAGEMENT APPARATUS, DOCUMENT REGISTRATION METHOD, PROGRAM, AND CONFERENCE SYSTEM

TECHNICAL FIELD

The present invention relates to a conference management apparatus, a document registration method, a program, and a conference system.

BACKGROUND ART

Conventionally, a network conference support system is known in which an agenda list is stored. For example, in the agenda list, for each of meeting agenda, a presenter is associated with a presentation document the presenter uses in his presentation (e.g., refer to Patent Document 1).

In a conference system in which a conference is conducted by displaying a document on a client terminal, a mechanism exists in which conference information and a document of a conference to be held are registered in a conference server apparatus. It should be noted that regarding the document registration, a document is not only registered to a conference, but also registered to one or more agenda which are registered to the conference.

In a conventional conference system, however, in the case where different users register a document to different agenda, it is necessary for a user to understand agenda in which the user registers his document, registering a document to agenda takes more time than registering a document to a conference, and a mistake is likely to occur.

Embodiments of the present invention are made in view of the above, whose objective is to provide a conference management apparatus, a document registration method, a program, and a conference system which make it easy to register a document to one or more agenda registered to a conference.

SUMMARY OF INVENTION

In order to achieve the above objective, claim 1 of the present invention recites a conference management apparatus for managing a conference held among a plurality of terminal apparatuses. The conference management apparatus includes a generation unit configured to generate identification information of a document registration screen for registering a document to one or more agenda registered to a conference and transmit the identification information of the document registration screen to a terminal apparatus of a user for registering the document to the agenda, and a document registration unit configured to, based on a screen data obtaining request specifying the identification information of the document registration screen, transmit screen data of the document registration screen to the terminal apparatus which is a source of the screen data obtaining request, and register the document the user has registered to the agenda in the document registration screen displayed on the terminal apparatus of the source of the screen data obtaining request, the document being associated with the agenda.

According to embodiments of the present invention, it becomes easy to register a document to one or more agenda registered to a conference.

BRIEF DESCRIPTION OF DRAWINGS

FIG. 1 is a configuration diagram of an example of a conference system according to the present embodiment.

FIG. 2 is a hardware configuration diagram of an example of a computer according to the present embodiment.

FIG. 3 is a functional block diagram of an example of a conference server apparatus.

FIG. 4 is a functional block diagram of an example of a client terminal.

FIG. 5 is a configuration diagram of an example of a conference information table.

FIG. 6 is a configuration diagram of an example of an agenda information table.

FIG. 7 is a configuration diagram of an example of a document information table.

FIG. 8 is a flowchart of an example of a conference/agenda registration process.

FIG. 9 is an image diagram of an example of a selection screen for selecting with-agenda or without-agenda when registering a conference.

FIG. 10 is an image diagram of an example of a conference-registration-without-agenda-registration screen.

FIG. 11 is an image diagram of an example of a conference-registration-with-agenda-registration screen.

FIG. 12 is an image diagram of an example of an agenda edit screen.

FIG. 13 is a drawing illustrating an example of a URL of a document registration screen.

FIG. 14 is a flowchart of an example of a document registration process without using a document registration URL.

FIG. 15 is an image diagram of an example of a document registration screen.

FIG. 16 is an image diagram of an example of a conference registration screen where a document is registered to agenda.

FIG. 17 is a flowchart of an example of a document registration process using a document registration URL.

FIG. 18 is an image diagram of an example of an agenda list screen.

DESCRIPTION OF EMBODIMENTS

Next, embodiments of the present invention will be described in detail.

First Embodiment

<System Configuration>

FIG. 1 is a configuration diagram of an example of a conference system according to the present embodiment. The conference system of FIG. 1 shows as an example a configuration in which a conference server apparatus 10 and a plurality of client terminals 12 are connected to a network N1 such as a LAN.

The conference server apparatus 10 receives a conference registration request, an agenda registration request, a document registration request, etc., and stores conference information, agenda information and document information which will be described below. Further, the conference server apparatus 10 conducts a conference and controls participants. The conference server apparatus 10 can be realized by software or services running on one or more computers. Further, the conference server apparatus 10 may take a form of so-called cloud services. The the conference server apparatus 10 can be realized by, for example, a dedicated apparatus for the conference system 1 or an information processing apparatus such as a typical workstation or a PC.

The client terminal 12 has a function for registering conference information, agenda information and document information in the conference server apparatus 10, and a function for displaying a list of conferences or agenda, and a document. It should be noted that the functions of the client terminal 12 to use may be limited according to privileges of the user. For example, a user who does not have a privilege to register conference information and agenda information may not be allowed to use a function of the client terminal 12 for registering the conference information and the agenda information.

The client terminal 12 may be a PC or a tablet terminal, a smart-phone or a mobile phone, a terminal apparatus such as a PDA, a virtual machine, a projector, an electronic blackboard, or an apparatus dedicated for the conference system 1. Application running on the client terminal 12 may be native application, or a Web browser and Web application running thereon.

Further, the client terminal 12 has a function for obtaining conference information, agenda information and document information from the conference server apparatus 10, downloading document data, and participating in the conference. It should be noted that in the conference system 1, any user participating in the conference may be capable of becoming a presenter.

While a conference is held, the client terminal 12 displays a list of agenda and a document. While the client terminal 12 is participating in a conference, the client terminal 12 displays the same document as displayed by other client terminals 12. The client terminal 12 may be capable of sharing the display screen with other client terminals 12 by receiving from the conference server apparatus 10 an input operation (e.g., turning-page operation) from another client terminal 12 such as a client terminal 12 of the presenter.

For example, when the page of the document is turned in the client terminal 12 of the presenter, the same page of the document is turned in the client terminal 12 of a user other than the presenter, and, as a result, the same screen is shared. Similarly, in the case where a list of agenda is displayed in the client terminal 12 of the presenter, the list of agenda is displayed in the client terminal 12 of a user other than the presenter (e.g., a participant), and, as a result, displays of the client terminals 12 participating in the conference are synchronized.

Further, when the presenter, by using a touch pen or a mouse operation, draws a mark or a line, or writes a handwritten memo for adding a letter in his client terminal 12, the same screen is reflected in the client terminals 12 of the participants.

In the conference system 1, the conference server apparatus 10 and the client terminals 12 are capable of data communication via the network N1. The network N1 may be not only a LAN, but also the Internet, or a dedicated line, a wired line or wireless.

<Hardware Configuration>

The conference server apparatus 10 and the client terminal 12 may be, for example, realized by a computer 100 with a hardware configuration shown in FIG. 2. FIG. 2 is a hardware configuration diagram of an example of a computer according to the present embodiment.

The computer 100 shown in FIG. 2 includes an input device 101, a display device 102, an external I/F 103, a RAM 104, a ROM 105, a CPU 106, a communication I/F 107, an HDD 108, etc., which are connected to each other via a bus B. It should be noted that the input device 101 and the display device 102 may take a form to be connected for use when needed.

The input device 101 includes a keyboard, a mouse, a touch panel, and the like, and is used for a user to input operation signals. The display device 102 includes a display and the like, and displays a result of a process by the computer 100.

The communication I/F 107 is an interface for connecting the computer 100 to various networks. As a result, the computer 100 is capable of data communication via the communication I/F 107.

Further, the HDD 108 is an example of a non-volatile storage device in which a program and data are stored. The stored program and data includes an OS which is basic software controlling the entire computer 100 and application software (hereinafter, simply referred to application) which provides various functions on the OS. It should be noted that the computer 100 may be configured to use, instead of using the HDD 108, a drive device (e.g., solid state drive: SSD) which includes a flash memory as a storage medium.

The external I/F 103 is an interface with an external apparatus. The external apparatus is, for example, a storage medium 103a. With the above configuration, the computer 100 is capable of reading from and/or writing to the storage medium 103a via the external I/F 103. The storage medium 103a includes a flexible disk, a CD, a DVD, a SD card, a USB memory, etc.

The ROM 105 is an example of a non-volatile semiconductor memory (storage device) which is capable of holding a program or data even when the power is turned off. The ROM 105 stores programs and data including a BIOS which runs at the startup of the computer 100, OS settings, and network settings. The RAM 104 is an example of a volatile semiconductor memory (storage device) which is capable of temporally holding a program or data.

The CPU 106 is an arithmetic device which realizes control and functions of the entire computer 100 by reading programs and data from a storage device such as the ROM 105 and the HDD 108, writing to the RAM 104, and performing processes.

The conference server apparatus 10 and the client terminal 12 are capable of realizing various processes which will be described later by running programs on the computer 100 with, for example, the above hardware configurations.

<Software Configuration>

The conference server apparatus 10 and the client terminal 12 according to the present embodiment can be realized by the following functional blocks.

<<Conference Server Apparatus>>

The conference server apparatus 10 can be realized by, for example, functional blocks as shown in FIG. 3. FIG. 3 is a functional block diagram of an example of the conference server apparatus 10. It should be noted that the functional blocks shown in FIG. 3 only indicate, of all functions provided by the conference server apparatus 10, functions necessary for describing the present embodiment. There may exist other functions.

By running programs, the conference server apparatus 10 realizes a send-and-receive control unit 21, an information processing unit 22, and an information management unit 23. Further, the information processing unit 22 includes a conference registration unit 31, an agenda registration unit 32, a document registration unit 33, a document registration URL (Uniform Resource Locator) generation unit 34, and a conference control unit 35.

The send-and-receive control unit 21 controls communications with the client terminal 12. The information processing unit 22 performs information processes of the conference registration unit 31, the agenda registration unit 32, the document registration unit 33, the document registration URL generation unit 34, the conference control unit 35, etc. Further, the information management unit 23 stores, for example, a conference information table, a document information table, and document data.

The conference registration unit 31, in response to a conference registration request received from the client terminal 12, sets conference information in the conference information table and registers a conference. The agenda registration unit 32, in response to a agenda registration request received from the client terminal 12, sets agenda information in the agenda information table and registers agenda. The document registration unit 33, in response to a document registration request received from the client terminal 12, sets document information in the document information table and registers a document.

The document registration URL generation unit 34 generates a document registration URL which will be described later. It should be noted that the document registration URL is a URL of a document registration screen for registering a document to each agenda of the conference. The document registration URL may be sent to a user by using email, or the document registration URL may be sent to a user by providing a function in which the document registration URL is sent from the conference server apparatus 10 to the client terminal 12.

The conference control unit 35 controls, for example, providing conference information and agenda information, providing documents, opening and ending a conference, sharing of display screens among the client terminals 12 participating the conference.

<<Client Terminal>>

The client terminal 12 can be realized by, for example, functional blocks as shown in FIG. 4. FIG. 4 is a functional block diagram of an example of the client terminal 12. It should be noted that the functional blocks shown in FIG. 4 only indicate, of all functions provided by the client terminal 12, functions necessary for describing the present embodiment. There may exist other functions.

By running programs, the client terminal 12 realizes a UI display unit 41, a send-and-receive control unit 42, and an information processing unit 43. Further, the UI display unit includes a display control unit 51 and an input operation control unit 52. Further, the information processing unit 43 includes an information registration request unit 61 and a conference processing unit 62.

The UI display unit 41 controls displaying UI of the display control unit 51, the input operation control unit 52, etc. The send-and-receive control unit 42 controls communications with the conference server apparatus 10. The information processing unit 43 performs information processing of the information registration request unit 61, the conference processing unit 62, etc.

The display control unit 51 controls displaying UI. The input operation control unit 52 receives an input operation by a user, and performs the control based on the input operation. The information registration request unit 61 sends a conference registration request, an agenda registration request, and a document registration request to the conference server apparatus 10. The conference processing unit 62 performs conference related processes. For example, after opening a conference, the conference processing unit 62 communicates with the conference server apparatus 10 by using the send-and-receive control unit 42, and shares the display screen of the agenda list and documents with other client terminals 12.

It should be noted that the functional blocks shown in FIG. 3 and FIG. 4 are examples. For example, a part of the functional blocks included in the conference server apparatus 10 of FIG. 3 may be operated by another information processing apparatus. In the case described above, the functional blocks communicate with each other when needed and exchange information.

<<Conference Information Table>>

The information management unit 23 stores a conference information table shown, for example, in FIG. 5. FIG. 5 is a configuration diagram of an example of the conference information table. In the conference information table of FIG. 5, conference information which is information related to a conference is set.

The conference information table of FIG. 5 includes items such as a conference ID, a conference name, date and time, a conference state, and with-or-without agenda. The conference ID is an example of identification information used for uniquely identifying a conference. The conference name is a name of the conference. The date and time is date and time for holding the conference. The conference state indicates states of the conference such as before-conference, during-conference, and after-conference. The with-or-without agenda indicates whether there is an agenda registration for the conference.

<<Agenda Information Table>>

The information management unit 23 stores an agenda information table shown, for example, in FIG. 6. FIG. 6 is a configuration diagram of an example of an agenda information table. In the agenda information table of FIG. 6, agenda information which is information related to agenda is set.

The agenda information table of FIG. 6 includes items such as an agenda ID, a conference ID, an agenda name, a presenter, and presentation time. The agenda ID is an example of identification information used for uniquely identifying agenda. The conference ID is an example of identification information used for uniquely identifying a conference. According to this conference ID, each record of the agenda information table corresponds to the conference information of FIG. 5. The agenda name is a name of the agenda. The presenter is a name of the presenter corresponding to the agenda. The presentation time is presentation time corresponding to the agenda.

<<Document Information Table>>

The information management unit 23 stores a document information table shown, for example, in FIG. 7. FIG. 7 is a configuration diagram of an example of a document information table. In the document information table of FIG. 7, document information which is information related to a document is set.

The document information table of FIG. 7 includes items such as a document ID, an agenda ID, a conference ID, a document name, and a stored location. The document ID is an example of identification information used for uniquely identifying a document. The agenda ID is an example of identification information used for uniquely identifying agenda. The conference ID is an example of identification information used for uniquely identifying a conference. According to the agenda ID and the conference ID, each record of the document information table corresponds to the conference information of FIG. 5 and the agenda information of FIG. 6.

The document name is a name of a document. The stored location is an example of location information in which an entity of a document (document data) is stored. In FIG. 7, an example is shown in which the document information table stores location information where document data is stored. However, the document information table may store the document data itself. It should be noted that, in FIG. 7, in a record identified by a document ID "γ", the agenda ID is blank, which shows an example in which a document is not registered to agenda but registered to a conference.

Further, a record identified by a document ID "α" shows an example in which a document is registered to agenda identified by an agenda ID "AAA". A record identified by a document ID "β" also shows an example in which a document is registered to agenda identified by an agenda ID "AAA". In this way, in the conference system 1 of the present embodiment, registration of a document is performed not only to a conference but also to agenda registered to the conference.

<Detailed Process Description>

In the following, detailed process description of the conference system 1 according to the present embodiment will be provided.

<<Conference/Agenda Registration Process>>

In the conference system 1 according to the present embodiment, it is necessary for conference information, agenda information and document information to be registered in the conference server apparatus 10 before the conference is held. A user such as an organizer of a conference operates a client terminal 12 and startups, for example, conference application. The client terminal 12 displays a top screen of the conference application.

When a new conference registration is selected from the top screen of the conference application, the display control unit 51 of the client terminal 12 starts processing conference/agenda registration shown in FIG. 8. FIG. 8 is a flowchart of an example of a conference/agenda registration process.

In step S10, the display control unit 51 displays, as shown in FIG. 9, a selection screen 1000 which is used for, when registering a conference, selecting whether the conference is a conference with agenda (a conference in which a document is registered to the agenda of the conference) or a conference without agenda (a conference in which a document is registered to the conference) FIG. 9 is an image diagram of an example of the selection screen 1000 for selecting with-agenda or without-agenda when registering a conference.

In the selection screen 1000 of FIG. 9, a conference with agenda can be selected by selecting "set agenda" and pressing "continue" button 1001. Further, in the selection screen 1000 of FIG. 9, a conference without agenda can be selected by selecting "not set agenda" and pressing "continue" button 1001.

When a conference without agenda is selected, in step S11, the display control unit 51 displays a conference-registration-without-agenda-registration screen as shown in FIG. 10. FIG. 10 is an image diagram of an example of the conference-registration-without-agenda-registration screen 1100.

In step S12, a user, after inputting conference information such as a conference name and conference starting date and time in the conference-registration-without-agenda-registration screen 1100 of FIG. 10, requests conference information registration by pressing "save" button 1101. The information registration request unit 61, by requesting the conference server apparatus 10 for registration of the conference information input in the conference-registration-without-agenda-registration screen 1100 of FIG. 10, registers the conference information without agenda in the conference server apparatus 10.

It should be noted that in the conference-registration-without-agenda-registration screen 1100 of FIG. 10, "add" button 1102 for registering a document to the conference is arranged. When the "add" button 1102 is pressed in the conference registration screen 1100, the display control unit 51 displays a screen for registering a document. It is possible for a user to register a document to a conference by pressing the "add" button 1102 in the conference-registration-without-agenda-registration screen 1100 of FIG. 10 and causing the screen for registering a document to be displayed. Registering a document to a conference may be performed at any time including at a conference registration time or after the conference registration.

On the other hand, when a conference with agenda is selected, in step S13, the display control unit 51 displays a conference-registration-with-agenda-registration screen 1200 as shown in FIG. 11. FIG. 11 is an image diagram of an example of the conference-registration-with-agenda-registration screen 1200.

In the conference-registration-with-agenda-registration screen 1200 of FIG. 11, similar to the conference-registration-without-agenda-registration screen 1100 of FIG. 10, columns for conference information input is arranged. Other than the columns for conference information input, in the conference-registration-with-agenda-registration screen 1200, "add" button 1201 for registering agenda to the conference and "document edit" button 1202 for editing a document registered to the agenda are arranged. Further, similar to the conference registration screen 1100 of FIG. 10, a user can request registration of the conference information by pressing "save" button 1203 in the conference registration screen 1200.

When the "add" button 1201 is pressed, the display control unit 51 displays an agenda edit screen 1300 for registering agenda as shown in FIG. 12. FIG. 12 is an image diagram of an example of the agenda edit screen 1300. It is possible for a user to register a document to a conference by pressing the "add" button 1201 in the conference-registration-with-agenda-registration screen 1200 of FIG. 11 and causing the agenda edit screen 1300 of FIG. 12 to be displayed. Registering agenda to a conference may be performed at any time including at a conference registration time or after the conference registration.

In the agenda edit screen 1300 of FIG. 12, "add" button 1301 for adding agenda is arranged. When the "add" button 1301 is pressed in the agenda edit screen 1300, the display control unit 51 displays a screen for registering agenda. A user presses the "add" button 1301 in the agenda edit screen 1300 to display the screen for registering agenda, and registers agenda. Registering agenda to a conference may be performed at any time including at a conference registration time or after the conference registration.

By pressing "end" button 1302 in the agenda edit screen 1300 of FIG. 12, a user can return to the conference registration screen 1200 of FIG. 11. In this way, in step S14, a user registers conference information from the conference-registration-with-agenda-registration screen 1200 of FIG. 11, and registers agenda information from the agenda edit screen 1300 of FIG. 12. Further, a user can request registration of the conference information by pressing the "save" button 1203 in the conference-registration-with-agenda-registration screen 1200 of FIG. 11.

The information registration request unit 61, by requesting the conference server apparatus 11 for registering the conference information input in the conference-registration-with-agenda-registration screen 1200 of FIG. 11, registers the conference information with agenda in the conference server apparatus 10. Further, the information registration request unit 61, by requesting the conference server apparatus 11 for registering the agenda information input in the screen for registering agenda, registers the agenda information for the conference in the conference server apparatus 10.

In step S15, the document registration URL generation unit 34 of the conference server apparatus 10 generates a URL of a document registration screen for registering a document for each of the agenda registered to the conference. It should be noted that a process in step S15 may be performed in the case where a mail button 1303 arranged in the agenda edit screen 1300 of FIG. 12 is pressed, or, in the case where a button for a user to request generation of a URL of a document registration screen is pressed. Further, the process in step S15 may be performed in the case where the agenda are registered to the conference. The document registration URL generated in step S15 is sent to a presenter (a user registering a document to each agenda item) of each agenda item in step S16.

FIG. 13 is a drawing illustrating an example of a URL of the document registration screen. In FIG. 13, an example is shown in which registration of conference and agenda is performed by a secretariat as an organizer the conference, and a document is registered by a presenter of each agenda item.

As described above, after registration of the conference and the agenda, the secretariat generates, for each agenda item of the conference, a document registration URL which is a URL of a document registration screen for registering a document, and sends the document registration URL to a presenter of each agenda item. The document registration URL includes a conference ID "mid=XXX-XXXXXXXX", an agenda ID "aid=aaa", and information indicating a document registration request "op=hoge". Therefore, the client terminal 12 can display the document registration screen for registering a document for each agenda item by accessing the document registration URL.

The presenter of each agenda item can display the document registration screen for registering his document by accessing the document registration URL using the client terminal 12. Therefore, it is not necessary for the presenter of each agenda item to select an agenda item for which he registers his document. As a result, the presenter does not register his document for a wrong agenda item.

Further, the secretariat can register the agenda for the conference by taking into account the order of agenda items beforehand. Therefore, there is no need for rearranging the order of documents by taking into account the order of agenda items after the document registration for each agenda item by the presenter.

Further, compared with the case where the secretariat used to collect documents for the agenda from presenters and register the documents for the agenda, the conference system 1 of the present embodiment 1 can take less time and effort of the secretariat and take care of modifying documents more responsively.

<<Document Registration Process>>

In the conference system 1 according to the present embodiment, other than the document registration process using document registration URL as described above, a document registration process without using a document registration URL is also available. FIG. 14 is a flowchart of an example of a document registration process without using a document registration URL.

In step S21, when a conference for which conference information is edited is selected from the list of conference, the display control unit 51 of the client terminal 12 starts the document registration process shown in FIG. 14. In step S21, in the case where the selected conference is a conference without agenda, the display control unit 51 moves to step S22 and accepts document registration for the selected conference. It is possible for a user to register a document for a conference without agenda by, for example, pressing the "add" button 1102 in the conference registration screen 1100 of FIG. 10 and causing the screen for registering a document to be displayed.

In the case where the selected conference is a conference with agenda, the display control unit 51 moves to step S23 and determines whether agenda have been created or have not been created. In the case where the selected conference is a conference for which the agenda have been created, the display control unit 51 moves to step S24 and accepts an agenda item selection from a list of agenda items registered for the selected conference. The agenda item selection can be performed by, for example, using radio buttons for agenda items in the agenda edit screen 1300 of FIG. 12.

Further, In the case where the selected conference is a conference for which the agenda have not been created, the display control unit 51 moves to step S25 and accepts an agenda registration for the selected conference. For example, a user presses the "add" button 1301 in the agenda edit screen 1300 of FIG. 12 to display a screen for registering agenda, and registers the agenda.

The display control unit 51, moving to step S26, displays the document registration screen 1400 as shown in FIG. 15, and causes the user to register a document. FIG. 15 is an image diagram of an example of a document registration screen 1400. The document registration screen 1400 includes agenda information display columns for displaying an agenda name, a presenter, presentation time, etc., included in the agenda information.

Further, in the document registration screen 1400, "add" button 1401 for registering a document to the agenda item is arranged.

By pressing the "add" button 1401 of the document registration screen 1400, the user can cause the screen for registering a document to be displayed. When the "add" button 1401 is pressed, the display control unit 51 displays the screen for registering a document. Using the screen for registering a document, the user can register a document to the agenda item selected in step S24, or registered in step S25.

FIG. 16 is an image diagram of an example of a conference registration screen 1500 where a document is registered to an agenda item. The document registration screen 1500 of FIG. 16 shows an example in which three documents are registered to corresponding agenda items selected in step S24, or registered in step S25.

As shown in FIG. 14, in the document registration process without using a document registration URL, layers of user's selection are deeper in the case of registering a document to the agenda item than in the case of registering a document to the conference.

On the other hand, in the document registration process using a document registration URL, the presenter can directly cause the document registration screen 1400 of FIG. 15 for registering a document to be displayed by accessing the document registration URL. Upon checking the agenda name, the presenter, the presentation time, etc., displayed in the agenda information display columns of document registration screen 1400 of FIG. 15 the user can register the document to the agenda item.

FIG. 17 is a flowchart of an example of a document registration process using a document registration URL. The input operation control unit 52, in step S31, receives an input of document registration URL from the presenter of the agenda item, and receives a request for accessing the document registration URL.

In step S32, the display control unit 51 requests the conference server apparatus 10 for screen data of the document registration screen 1400 for the target agenda item by specifying the document registration URL. A document registration unit 33 of the conference server apparatus 10 sends the screen data of the document registration screen 1400 of the target agenda item corresponding to a conference ID and an agenda ID included in the document registration URL. The display control unit 51 of the client terminal 12 receives the screen data of the document registration screen 1400 of the target agenda item, and displays the document registration screen 1400. As a result, in step S33, the presenter can register a document using the document registration screen 1400 of the target agenda item.

<<Conducting a Conference>>

The client terminal 12 connects with the conference server apparatus 10 and displays a list of registered conferences. The user can select a conference the user wants to open or participate in from the displayed list of the conferences. The display control unit 51 of the client terminal 12 displays a list of agenda items or a document of the conference the user has opened or has participated in.

During the conference, the client terminal 12 of the presenter sends a page turning operation and a memo writing operation by the presenter to the conference server apparatus 10. The conference server apparatus 10 sends the received page turning operation and the memo writing operation by the presenter to client terminals 12 participating in the conference. Thus, it becomes possible for the participating client terminals 12 to share the display screen with the client terminal 12 of the presenter.

Further, upon receiving an operation from the presenter for displaying a list of agenda, the client terminal 12 of the presenter sends an operation for displaying the list of the agenda to the conference server apparatus 10. The conference server apparatus 10 sends the received operation for displaying the list of the agenda by the presenter to the client terminals 12 participating in the conference. Thus, it becomes possible for the participating client terminals 12 to share the agenda list display screen with the client terminal 12 of the presenter.

The client terminal 12 displays an agenda list as shown in, for example, FIG. 18. FIG. 18 is an image diagram of an example of the agenda list screen 1600. The agenda list screen 1600 of FIG. 18 is an example in which seven agenda items are registered for a conference whose conference name is "Result report meeting". It should be noted that a document mark 1601 is shown for an agenda item for which a document is registered.

Upon receiving an operation from the presenter for selecting an agenda item for which the document mark 1601 is displayed, the client terminal 12 sends the operation for selecting the agenda item to the conference server apparatus 10. The conference server apparatus 10 sends the received operation for selecting the agenda item to the client terminals 12 participating in the conference. Thus, it becomes possible for each of the participating client terminals 12 to share and display the document which is registered for the agenda item with the client terminal 12 of the presenter.

CONCLUSION

The conference system 1 of the present embodiment, in the case of registering a document for one or more agenda items registered for a conference, creates a URL of a document registration screen for registering a document for each agenda item of the conference, and sends the URL to a presenter of the agenda item (a user who registers the document to the agenda item). By accessing the received URL, the client terminal 12 can display the document registration screen to be used by the user for registering the document. Therefore, the conference system 1 of the present embodiment can prevent the user from registering the document to a wrong agenda item, and reduce the time and effort of the user.

The present invention is not limited to the above specifically described embodiments, and various variations and modifications can be made without departing from the scope of the claims. In the present embodiment, a conference system 1 has been shown as an example, but the present invention can be applied to another system such as a seminar system or an education system in which a document for created information (a lecture or a class) is registered.

Further, in the present embodiment, a document registration URL has been shown as an example of information for reporting the document registration screen from the client terminal 12 to the conference server apparatus 10, but another information other than the URL may be used as long as it can identify the document registration screen.

For example, the client terminal 12 is an example of a terminal apparatus recited in the claims. The conference server apparatus 10 is an example of a conference management apparatus. The document registration URL generation unit 34 is an example of a generation unit. The document registration unit 33 is an example of a document registration unit. The conference registration unit 31 is an example of a conference registration unit. The document registration unit 32 is an example of a document registration unit. The document registration URL is an example of identification information of a document registration screen. The agenda edit screen 1300 is an example of an agenda registration screen.

It should be noted that a conference system 1 including a conference server apparatus 10 and one or more client terminals 12 is an example, and it is needless to say that there are various configuration examples according to a use or a purpose.

The present application is based on and claims the benefit of priority of Japanese Priority Application No. 2014-170717 filed on Aug. 25, 2014, the entire contents of which are hereby incorporated by reference.

REFERENCE SIGNS LIST

1 Conference system
10 Conference server apparatus
12 Client terminal
21 Send-and-receive control unit
22 Information processing unit
23 Information management unit
31 Conference registration unit
32 Agenda registration unit
33 Document registration unit
34 Document registration URL generation unit
35 Conference control unit
41 UI display unit
42 Send-and-receive control unit
43 Information processing unit
51 Display control unit
52 Input operation control unit
61 Information registration request unit 62 Conference processing unit
100 Computer
101 Input device
102 Display device
103 External I/F
103a Storage medium
104 RAM (Random Access Memory)
105 ROM (Read Only Memory)
106 CPU (Central Processing Unit)
107 Communication I/F
108 HDD (Hard Disk Drive)
B Bus
N1 Network

CITATION LIST

Patent Literature

PTL 1: Patent document 1: Japanese Laid-Open Patent Application No. 2006-279535

The invention claimed is:

1. A conference management apparatus for managing a conference held among a plurality of terminal apparatuses, the conference management apparatus comprising:
a memory; and
a processor coupled to the memory,
wherein the processor
generates, for each of a plurality of agenda items registered for inclusion in an agenda of the conference by a user, identification information that identifies a corresponding document registration screen, each of the identification information being a unique Uniform Resource Locator (URL) for each agenda item on the agenda, each URL including second identification information identifying the conference and third identification information identifying a particular agenda item registered for the conference, and each URL allowing a presenter to register a document for the presenter's part of the agenda,
sends one of the URLs to a first terminal apparatus of the presenter,
receives a first screen data acquisition request including the sent URL from the first terminal apparatus of the presenter,
sends data for generating the document registration screen corresponding to the sent URL to the first terminal apparatus of the presenter in response to receiving the first screen data acquisition request including the sent URL including the third identification information identifying the particular agenda item, and
registers a document selected by the presenter to be registered with the particular agenda item in the document registration screen displayed on the first terminal apparatus of the presenter, thereby associating the selected document with the particular agenda item, and
wherein the document registration screen corresponding to the sent URL is displayed on the first terminal apparatus of the presenter without requiring the presenter to select the particular agenda item among the plurality of agenda items.

2. The conference management apparatus according to claim 1, wherein, in response to receiving a second screen data acquisition request, the processor
sends, to a second terminal apparatus of a second user, data for generating a selection screen used for selecting between a with-agenda-conference information registration screen and a without-agenda-conference information registration screen before sending data for generating a conference registration screen to the second terminal apparatus of the second user, and
prompts the second user to select between the with-agenda-conference information registration screen and the without-agenda-conference information registration screen in the selection screen displayed on the second terminal apparatus of the second user.

3. The conference management apparatus according to claim 2, wherein, in the case where the with-agenda-conference information registration screen is selected in the selection screen, the processor
sends data for generating the with-agenda-conference information registration screen to the second terminal apparatus of the second user, and
registers conference information indicated by the second user to register with a with-agenda conference in the with-agenda-conference information registration screen displayed on the second terminal apparatus of the second user.

4. The conference management apparatus according to claim 2, wherein the processor
sends data for generating an agenda registration screen to the second terminal apparatus of the second user in response to receiving, from the second terminal apparatus of the second user, a third screen data acquisition request for the agenda registration screen used for registering agenda information, and
registers the agenda information the second user indicates to register with the conference in the agenda registration screen displayed on the second terminal apparatus of the second user, thereby associating the agenda information with the conference.

5. The conference management apparatus according to claim 4, wherein the processor
receives the third screen data acquisition request for the agenda registration screen from the second terminal apparatus of the second user in the with-agenda-conference information registration screen.

6. The conference management apparatus according to claim 4, wherein the processor sends data for generating a screen that is the same as the document registration screen displayed on the first terminal to the second terminal apparatus of the second user in response to selecting, by the second user, the agenda item among the plurality of the agenda items corresponding to the sent URL on an agenda edit screen.

7. The conference management apparatus according to claim 2, wherein, in the case where the without-agenda-conference information registration screen is selected in the selection screen, the processor
sends data for generating the without-agenda-conference information registration screen to the second terminal apparatus of the second user, and
registers conference information the second user indicates to register with a without-agenda conference in the without-agenda-conference information registration screen displayed on the second terminal apparatus of the second user.

8. The conference management apparatus according to claim 1, wherein the identification information identifying the document registration screen corresponding to the sent URL is sent by email to the first terminal apparatus of the presenter.

9. A document registration method performed by a conference management apparatus that manages a conference held among a plurality of terminal apparatuses, the document registration method comprising:
  generating, for each of a plurality of agenda items registered for inclusion in an agenda of the conference by a user, identification information that identifies a corresponding document registration screen, each of the identification information being a unique Uniform Resource Locator (URL) for each agenda item on the agenda, each URL including second identification information identifying the conference and third identification information identifying a particular agenda item registered for the conference, and each URL allowing a presenter to register a document for the presenter's part of the agenda;
  sending one of the URLs to a first terminal apparatus of the presenter;
  receiving a first screen data acquisition request including the sent URL from the first terminal apparatus of the presenter;
  sending data for generating the document registration screen corresponding to the sent URL to the first terminal apparatus of the presenter in response to receiving the first screen data acquisition request including the sent URL including the third identification information identifying the particular agenda item; and
  registering a document selected by the presenter to be registered with the particular agenda item in the document registration screen displayed on the first terminal apparatus of the presenter, thereby associating the selected document with the particular agenda item, and
  wherein the document registration screen corresponding to the sent URL is displayed on the first terminal apparatus of the presenter without requiring the presenter to select the particular agenda item among the plurality of agenda items.

10. The document registration method according to claim 9, further comprising:
  sending, to a second terminal apparatus of a second user, data for generating a selection screen used for selecting between a with-agenda-conference information registration screen and a without-agenda-conference information registration screen before sending data for generating a conference registration screen to the second terminal apparatus of the second user, and
  prompting the second user to select between the with-agenda-conference information registration screen and the without-agenda-conference information registration screen in the selection screen displayed on the second terminal apparatus of the second user.

11. The document registration method according to claim 10, wherein, in the case where the with-agenda-conference information registration screen is selected in the selection screen, the method further comprising:
  sending data for generating the with-agenda-conference information registration screen to the second terminal apparatus of the second user, and
  registering conference information indicated by the second user to register with a with-agenda conference in the with-agenda-conference information registration screen displayed on the second terminal apparatus of the second user.

12. The document registration method according to claim 10, further comprising:
  sending data for generating an agenda registration screen to the second terminal apparatus of the second user in response to receiving, from the second terminal apparatus of the second user, a third screen data acquisition request for the agenda registration screen used for registering agenda information, and
  registering the agenda information the second user indicates to register for the conference in the agenda registration screen displayed on the second terminal apparatus of the second user, thereby associating the agenda information with the conference.

13. The document registration method according to claim 12, further comprising:
  receiving the third screen data acquisition request for the agenda registration screen from the second terminal apparatus of the second user in the with-agenda-conference information registration screen.

14. The document registration method according to claim 10, wherein, in the case where the without-agenda-conference information registration screen is selected in the selection screen, the method further comprising:
  sending data for generating the without-agenda-conference information registration screen to the second terminal apparatus of the second user, and
  registering conference information the second user indicates to register with a without-agenda conference in the without-agenda-conference information registration screen displayed on the second terminal apparatus of the second user.

15. The document registration method according to claim 9, wherein the identification information identifying the document registration screen corresponding to the sent URL is sent by email to the first terminal apparatus of the presenter.

16. A conference system in which a program executed by a plurality of terminal apparatuses communicates via a network with a conference management apparatus for managing a conference held among the plurality of the terminal apparatuses, the conference management apparatus comprising:
  a memory; and
  a processor coupled to the memory,
  wherein the processor
    generates, for each of a plurality of agenda items registered for inclusion in an agenda of the conference by a user, identification information that identifies a corresponding document registration screen, each of the identification information being a unique Uniform Resource Locator (URL) for each agenda item on the agenda, each URL including second identification information identifying the conference and third identification information identifying a particular agenda item registered for the conference, and each URL allowing a presenter to register a document for the presenter's part of the agenda,
    sends one of the URLs to a first terminal apparatus of the presenter,
    receives a first screen data acquisition request including the sent URL from the first terminal apparatus of the presenter,
    sends data for generating the document registration screen corresponding to the sent URL to the first terminal apparatus of the presenter in response to receiving the first screen data acquisition request including the sent URL including the third identification information identifying the particular agenda item, and registers a document selected by the presenter to be registered with the particular agenda item in the document registration screen displayed on the first terminal apparatus of the presenter, thereby associating the selected document with the particular agenda item, and wherein the document registration screen corresponding to the sent URL is displayed on the first terminal apparatus of the presenter without requiring the presenter to select the particular agenda item among the plurality of agenda items.

* * * * *